(12) United States Patent
Allen

(10) Patent No.: US 6,898,864 B2
(45) Date of Patent: May 31, 2005

(54) LOCKING TAPERED SLIDING DOVETAIL JOINT AND TOOL AND METHOD FOR MAKING THE JOINT

(76) Inventor: Patrick J. Allen, 8667 Arcturus Dr., Cincinnati, OH (US) 45249

( * ) Notice: Subject to any disclaimer, the term of this patent is extended or adjusted under 35 U.S.C. 154(b) by 0 days.

(21) Appl. No.: 10/827,976

(22) Filed: Apr. 20, 2004

(65) Prior Publication Data

US 2004/0194333 A1 Oct. 7, 2004

Related U.S. Application Data

(63) Continuation-in-part of application No. 10/215,526, filed on Aug. 9, 2002.

(51) Int. Cl.[7] ................................................ G01B 3/14
(52) U.S. Cl. ........................... 33/638; 33/562; 144/372
(58) Field of Search .......................... 33/638, 626, 628, 33/562, 563, 566, 531; 144/359, 363, 372

(56) References Cited

U.S. PATENT DOCUMENTS

| | | |
|---|---|---|
| 2,764,191 A | 9/1956 | Hartmann |
| 3,376,650 A | 4/1968 | Cook |
| 3,878,875 A | 4/1975 | McCord, Jr. |
| 4,435,906 A | 3/1984 | Mori |
| 4,479,523 A | 10/1984 | Peterson et al. |
| 4,603,717 A | 8/1986 | Thomas |
| 5,454,331 A | 10/1995 | Green |
| 6,243,963 B1 | 6/2001 | Jones et al. |
| 6,732,444 B2 * | 5/2004 | Allen ........................ 33/638 |

* cited by examiner

Primary Examiner—Christopher W. Fulton
(74) Attorney, Agent, or Firm—David M. Weirich

(57) ABSTRACT

A tool for making locking tapered sliding dovetail joints and a kit including the tool. The tool includes a guide plate having a guide groove including a locking section disposed on at least one of edges of the groove guide, wherein at least a portion of the locking section is disposed in a plane that is different from the plane of the groove edge corresponding to the groove edge on which the locking section is located.

32 Claims, 8 Drawing Sheets

LOCKING TAPERED SLIDING DOVETAIL JOINT AND TOOL AND METHOD FOR MAKING THE JOINT

CROSS-REFERENCE TO RELATED APPLICATIONS

This application is a continuation-in-part of U.S. Ser. No. 10/215,526, filed Aug. 9, 2002.

FIELD OF THE INVENTION

The present invention is directed to a joint useful for woodworking and other crafts and a tool and method for making the joint. More particularly, the present invention relates to a locking tapered sliding dovetail joint and a tool and method that can be used to form the locking tapered sliding dovetail joints in workpieces.

BACKGROUND

In woodworking and other crafts, it is often desirable to form dovetail joint between two workpieces and/or other structures. The dovetail joint is typically made up of a dovetail pin and a dovetail groove. The dovetail is typically cut with a slight interference so that the joint fits snuggly together to form a locking joint. The dovetail joint is often used in drawer construction. In such embodiments, a series of pins are generally cut into the end of one work piece that fit into a matching set of dovetail grooves cut into a corresponding workpiece. In such applications, the ends of two workpieces are typically joined across their width at their edges to form a 90° joint.

A second less commonly found dovetail joint is the tapered sliding dovetail joint. One place where this type of joint is used is in the construction of cabinets and bookcases, where fixed shelves are joined to the sides of the structure. This type of joint is difficult to prepare, so it is rarely used except by the most skilled and experienced craftsmen. The tapered sliding dovetail joint is typically used to join the face of one workpiece to the end of another workpiece. In this application a dovetail groove is formed in the face of one workpiece. The dovetail groove typically starts on the edge of the workpiece and continues across the width of the workpiece generally terminating short of the opposite edge of the workpiece, so as to not weaken the workpiece. A single matching dovetail pin is formed on the end of the corresponding workpiece. The pin is typically configured to stop short of the edge of the workpiece so that it matches the dovetail groove formed in the face of the other workpiece. The workpieces are joined by inserting the minor end of the pin into open dovetail groove and sliding them together to achieve the desired fit. Generally, it is preferred that the dovetail groove and dovetail pin be tapered evenly through their length to allow the work pieces to be assembled to each other and to allow the proper interference of fit to be achieved to form a locking joint. However, the taper makes it very difficult for the average woodworker to form reliably with conventional tools and ensure that the pieces will fit together without too much force and yet fit snuggly together.

Due to the difficulty in forming suitable tapered pins and grooves for use in sliding dovetail joints, it would be desirable to provide devices for easily forming both the tapered sliding dovetail pin and the matching tapered sliding dovetail groove of a tapered sliding dovetail joint. Further, it would be desirable to provide a device that allows one to use conventional tools to accurately taper the pin and/or groove of the workpiece so as to provide a snug fit between the pin and groove. Even further, it would be desirable to provide a sliding dovetail joint with a locking feature that is easy to make and use, and the tool to make such a joint. Further yet, it would be advantageous to provide a pin guide and/or a groove guide that is stand alone in the sense that it need not attached to or otherwise used in conjunction with another piece of equipment, such as a workbench.

SUMMARY OF THE INVENTION

The present invention provides a unique locking sliding dovetail joint and a template for making such locking tapered sliding dovetail joints in workpieces. The template comprises a groove guide made from a plate having a length, a width, a thickness, a top surface, a bottom surface, a perimeter and at least one groove having a longitudinal centerline, a first groove edge disposed in a first plane, a second groove edge disposed in a second plane, a first end having a minor width and a second end having a major width that is larger than the minor width, wherein the first end of the groove is located inward from the perimeter of the plate. The groove guide includes a locking section disposed on at least one of the first groove edge or the second groove edge, wherein at least a portion of the locking section is disposed in a plane that is different from the first plane or the second plane which corresponds to the first or second groove edge on which the locking section is located. The guide plate may also include at least one stabilizing member disposed on the bottom surface of the template for holding the template in place while the sliding dovetail groove is being formed in the workpiece.

The present invention may include, in addition to or in place of the groove guide, at least one pin guide having a longitudinal centerline, a pair of side edges, a workpiece side, a tool side, a minor end having a minor width and a major end having a major width that is larger than the minor width such that the template has a taper in width from the major end to the minor end, and at least one stabilizing member disposed on the workpiece side of the template for holding the template in place while the sliding dovetail pin is being formed from the workpiece.

The present invention may also be provided in the form of a kit including one or more of either or both the groove guide or pin guide along with other tools. For example, the kit may include a router stabilizer comprising a first rail member, a second rail member, and at least one spacing element, the spacing element providing a means for holding the first rail member and the second rail member in a desired configuration with respect to each other. The kit may also include a dept of cut gage, instructions for using pin guide and/or the groove guide and/or a package for storing the pin guide and the groove guide.

DESCRIPTION OF THE DRAWINGS

While the specification concludes with claims pointing out and particularly claiming the present invention, it is believed that the invention will be better understood by referring to the following drawings taken in conjunction with the accompanying specification.

DETAILED DESCRIPTION OF THE INVENTION

Figure 1A:
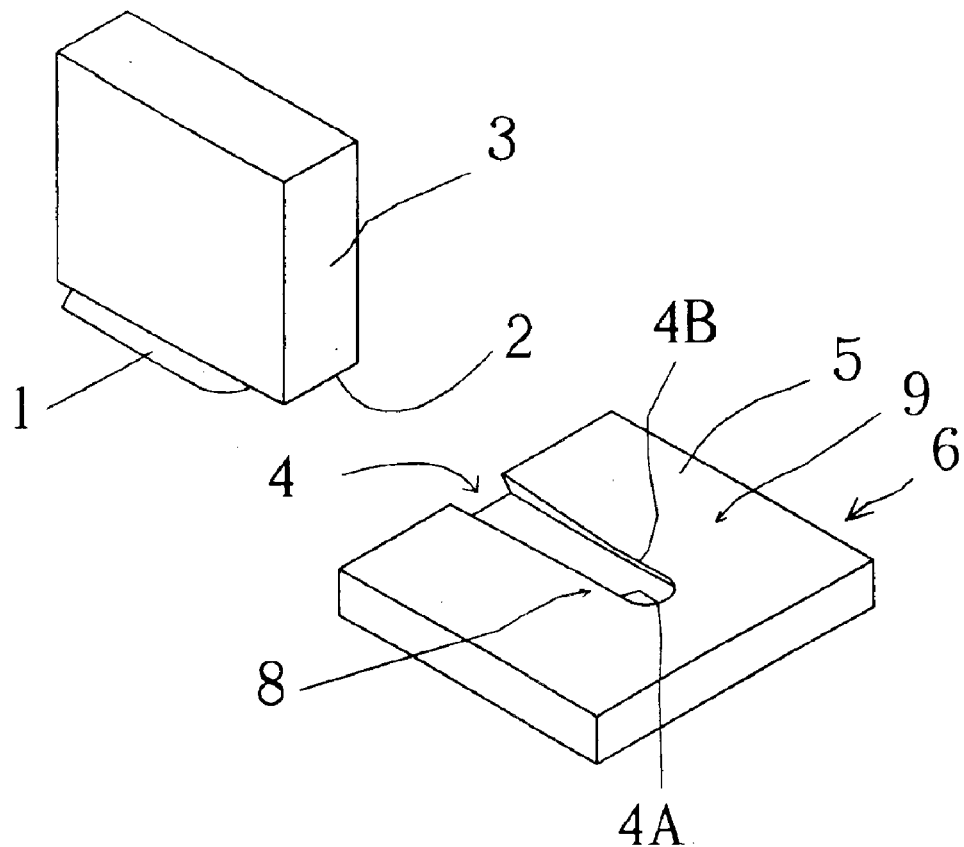
FIG. 1A is a perspective view of workpieces showing the pin and groove formed in accordance with one embodiment of the present invention.
Figure 1B:
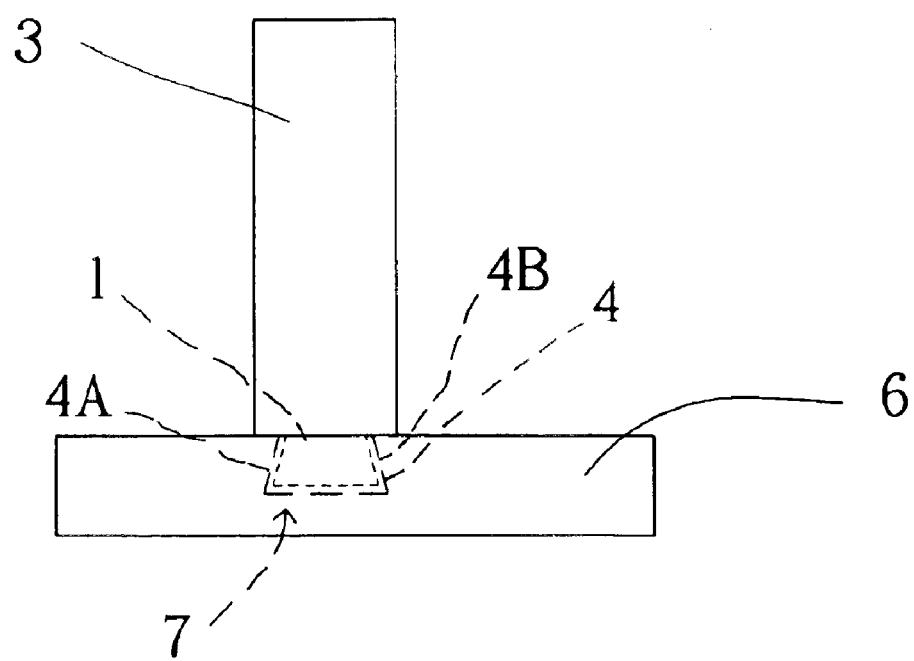
FIG. 1B is a side view of the workpieces of FIG. 1A shown joined together by a dovetail joint formed by inserting the pin of one workpiece into the groove of the other workpiece.

The present invention is directed to a locking sliding dovetail joint and a tool and method for making such a joint. The present invention may also be provided in the form of a kit including one or more tools useful for forming dovetail joints. As noted above, a dovetail joint is often used in woodworking and other crafts to hold workpieces together. Typically, a tapered sliding dovetail joint is formed by forcing a tapered dovetail pin formed on the end of a workpiece into a tapered sliding dovetail groove formed in another structure. FIG. 1A shows an exemplary embodiment of the components that typically make up a dovetail joint. The male portion, referred to herein as pin 1, is formed on the end 2 of a first workpiece 3. Female portion, referred to herein as groove 4, is formed into the joining side 5 of a second workpiece 6. Locking region 8, which will be described in more detail below, is shown to be formed in the groove 4. FIG. 1B shows first workpiece 3 joined to second workpiece 6 by means of a dovetail joint 7 formed by sliding the pin 1 of workpiece 3 into the groove 4 of workpiece 6. The pin 1 should generally fit snugly into the groove 4 such that when the pin 1 is in its final position within the groove 4 that a joint 7 with adequate strength for the desired purpose is provided. Further, in many instances, it is desirable for the joint 7 to be snug throughout much, if not all, of its length. However, for simplicity, it is desirable to be able to slide the pin 1 into the groove 4 with reasonable force, that is by hand or with the assistance of hand tools such as a mallet, hammer, etc. Accordingly, it is often preferred to taper either the pin 1 or groove 4, or both to allow for ease of use without significantly reducing the strength or snug fit of the joint 7. The present invention provides tooling to make such tapered sliding dovetail grooves and/or pins with conventional handheld tools, such as routers.

In certain embodiments, it may be desirable to provide the user with a locking mechanism 9 for creating a locking joint. Although such a locking joint may be desirable in any size workpiece having any size joint, locking joints are especially useful when the length of the joint is relatively small, such as, for example less than about 12 inches (about 30.48 cm), less than about 6 inches (about 15.24 cm), less than about 4 inches (about 10.16 cm) and less than about 2 inches (about 5.08 cm). In addition, it may be desirable to provide one or more tools that are designed to direct the cutting tool in such a way that at least a portion of one of the sides of the groove 4 in the workpiece 6 acts to increase the friction between the pin 1 and the groove 4 or otherwise provide a locking feature to the joint. In one embodiment, as shown in FIGS. 1A and 1B, the groove 4 of the workpiece 6 may be provided with a locking section 8. The locking section 8 can be a portion of one of the longitudinal sides 4A and/or 4B of the groove 4 that is not in the same plane as the rest of the corresponding longitudinal side of the groove 4. As such, the locking section 8 can provide an area of increased friction between the pin 1 and the groove 4 in the locking region 8. Thus, when the pin 1 is slid into the groove 4 such that it extends into the locking section 8, it effectively becomes locked into position.

The locking mechanism 9 can be permanent in the sense that once locked, the joint can't be opened without damaging some portion of the pin 1 or groove 4. Alternatively, the locking mechanism 9 can be releasable such that even after the pin 1 and groove 4 are completely engaged and locked into position, they can be disengaged and/or reengaged without significant damage to the pin 1 or groove 4.

The locking mechanism 9 can include any suitable structure on the groove 4. In certain embodiments, as shown in FIGS. 1A and 1B, the locking mechanism 9 can take the form of a relatively untapered section in one or more of the tapered walls, sides 4A and/or 4B of the groove 4. Additionally, a locking mechanism 9 can also be disposed on the pin 1. In any case, the locking mechanism 9 can include one or more locking elements or sections 8 that are the same or different and can be disposed anywhere on the groove 4 or the groove 4 and pin 1.

Tapered Sliding Dovetail Guide Plate

FIGS. 2A–2D show several exemplary embodiments of tapered sliding dovetail guide plates 10. In general, the guide plate 10 is used to guide a tool such as a router over a workpiece when the user is cutting a tapered sliding dovetail groove into the workpiece. The guide plates 10 shown in FIGS. 2A–2D each have a length 12, a width 14, a thickness 16, a top surface 18, an opposed bottom surface 20 and a perimeter 15 including a pair of end edges 21 and a pair of longitudinal edges 23. The guide plate 10 also includes at least one guide groove 22 through which the cutting mechanism of a router or other cutting tool may be passed. (For simplicity, a single guide groove will be described, however, it is contemplated that more than one guide groove 22 can be disposed in a guide plate 10. Further, it is contemplated that two or more guide plates 10 each having any number of grooves 22 could be associated with each other, permanently or non-permanently, to form a single tool.) The guide groove 22 passes completely through the thickness 16 of the plate 10 from the top surface 18 to the bottom surface 20. The guide groove 22 has a longitudinal centerline 24, a groove length 25, a first end 26, a second end 28 and a pair of longitudinal groove edges 27 and 29. In the shown embodiment, the guide groove 22 is tapered in width from its first end 26 to its second end 28. Thus, the first end 26 of the guide groove 22 has minor width 30 that is less than the major width 32 of the guide groove 22 at its second end 28.

The guide groove 22 can be located anywhere on the plate 10 and can have any groove length 25. (If multiple guide grooves are formed in the plate 10, the guide grooves 22 can be the same or different in any desirable aspect.) At least the first end 26 the guide groove 22 should be located longitudinally inward from the corresponding end edge 21 of the plate 10. This allows for cutting an accurate half-blind groove, such that the first end 26 the guide groove 22 is located inward from the edge of the workpiece and thus, generally can't be seen when the joint is put together. It may also be preferred to locate the first end 26 of the guide groove 22 at a particular location with respect to the edge 21 of the plate 10. That is, it may be useful to locate the first end 21 of the groove 10 at a distance from the corresponding end 21 of the plate 10 such that typical router tools will not cut past the end of the workpiece when the end edge 21 of the plate 10 is lined up with the edge of the workpiece. The location of the first end 26 may also affect the strength of the joint and will often be coordinated with the location of the pin on the workpiece to be joined to the grooved workpiece.

Figure 2:
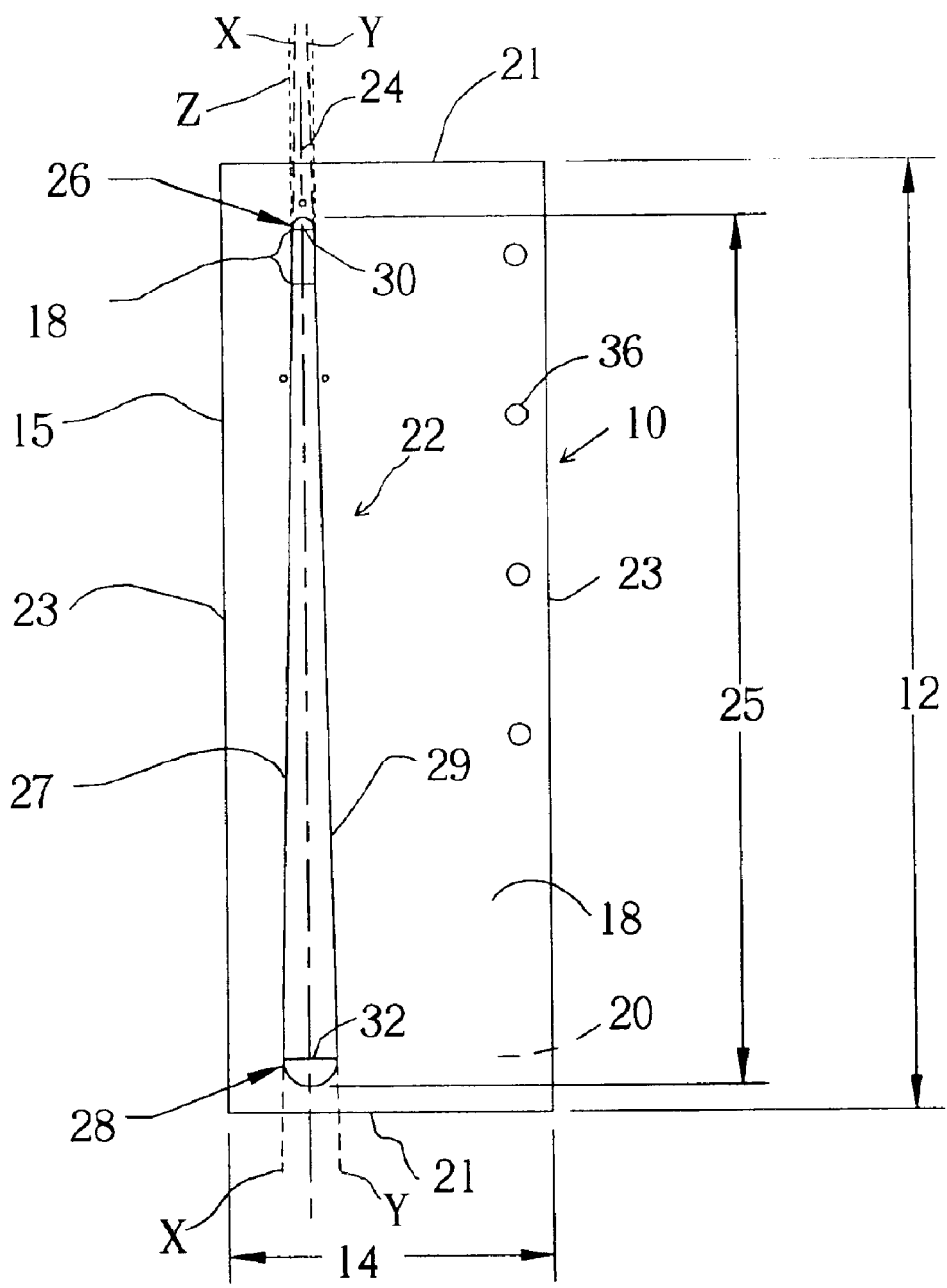
FIG. 2A is a plan view of one exemplary embodiment of a tapered sliding dovetail guide plate.
FIG. 2B is an end view of the tapered sliding dovetail guide plate shown in FIG. 2A.
FIG. 2C is a plan view of an alternative exemplary embodiment of a tapered sliding dovetail guide plate.
FIG. 2D is a plan view of an alternative exemplary embodiment of a tapered sliding dovetail guide plate.
FIG. 2E is an enlarged plan view of a portion of the tapered sliding dovetail guide plate shown in FIG. 2D.
Figure 2:
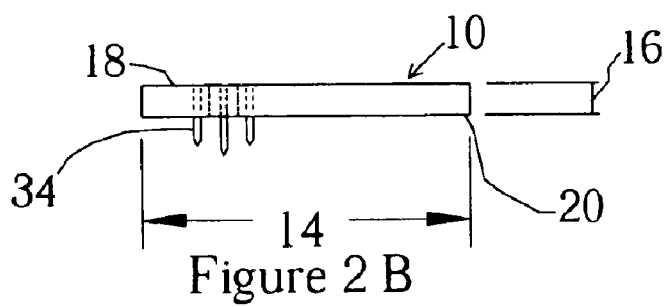

In certain embodiments, as shown in FIG. 2A, the longitudinal centerline 24 of the guide groove 22 may be generally parallel to at least one of the longitudinal edges 23 of the plate 10. Further, the longitudinal centerline 24 of the guide groove 22 may be a particular distance from the longitudinal edge 23 of the guide plate 10. This can help provide the user with a reference point from which the location of the groove in the workpiece will be located after the cut is made. Accordingly, although not critical to the invention, the location of the guide groove 22 in the plate 10 may be chosen so as to help the user properly locate the device during use and/or the groove to be cut into the workpiece.

In one exemplary embodiment, the longitudinal centerline 24 of the guide groove 22 may be located about 1.5 in (about 3.8 cm) from one of the longitudinal edges 23 of the plate 10. Further, the first end 26 of the guide groove 22 may be located about 1 inch (about 2.54 cm) from one of the end edges 21 of the plate 10. The minor width 30 may be about 7/16 inch (about 1.112 cm), having about a 7/32 inch (about 0.556 cm), 180 degree radius. In certain preferred embodiments, it may be desirable to match the minor width 30 with the outside diameter of the router bushing that extends into the guide groove 22 when used (e.g. the bushing of the router tool or other cutting mechanism being used). This allows the cutter to terminate the tapered sliding dovetail groove 4 at a controlled diameter that can be matched to the diameter of the corresponding tapered sliding dovetail pin. Accordingly, when the pin is inserted completely into the groove 4, it will be snug.

Figure 2C:
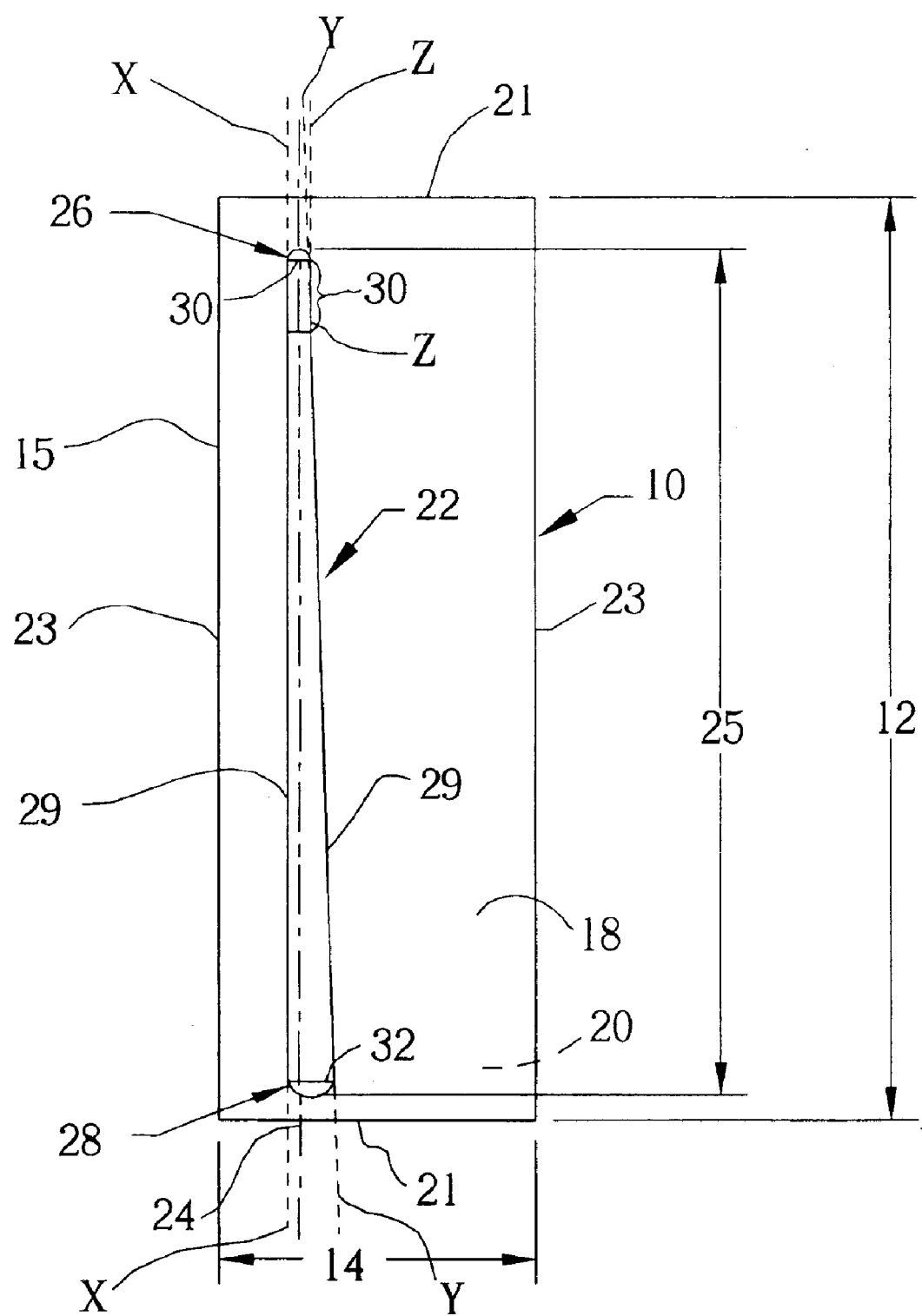

The guide groove 22 may be tapered so as to increase the width of the guide groove 22 as one moves from the first end 26 to the second end 28. In one embodiment, the taper may be such that the width of the groove 24 increases by about 1/16 of an inch (about 0.158 cm) about every foot (about 30.48 cm) of length, or about 0.2984 degrees. In a preferred embodiment, the guide groove 22 should have a second end 28 with a major width 32 that is at least about ½ inch (about 1.27 cm). This allows for easy insertion of a ½ inch (about 1.27 cm) cutting tool to be passed through the guide groove 22 without risking damage to the guide groove 22 or cutting tool. It should be noted that the guide groove 22 may be tapered along one or both of its longitudinal sides 27 and 29. That is, one or both of the longitudinal groove sides 27 and/or 29 may be nonparallel to the longitudinal centerline 24 of the guide groove 22. In a preferred embodiment, both longitudinal guide groove sides 27 and 29 are nonparallel to the longitudinal centerline 24 and each other. An example of this is shown in FIG. 2A. An example of an embodiment where one of the longitudinal sides, side 27 is generally parallel to the longitudinal centerline 24 and the other longitudinal side 29 of the guide groove 22 is not is shown in FIG. 2C.

In certain embodiments, it may be desirable to provide the guide plate 10 with a locking element or section that is designed to direct the cutting tool in such a way that at least a portion of one of the sides of the groove 4 in the workpiece 6 acts to increase the friction between the pin 1 and the groove 4 or otherwise provide a locking feature to the joint. In one embodiment, as shown in FIG. 2A, the longitudinal edges 27 and 29 of the guide groove 22 include a locking section 18 that is not in the same plane as the rest of the corresponding longitudinal side of the guide groove longitudinal edges 27 and 29 (i.e. plane Z of the locking section 18 is not the same as plane X or plane Y of longitudinal edges 27 and 29, respectively). As such, the locking section 18 directs the cutting tool to cut the groove 4 in the workpiece 6 so as to provide an area of increased friction between the pin 1 and the groove 4 in the locking region 8. Thus, when the pin 1 is slid into the groove 4 such that it extends into the locking section 8, it effectively becomes locked into position.

The locking section 18 of the guide groove 22 can include any suitable structure for providing a locking region 8 on the groove 4. In certain embodiments, as shown in FIG. 2A, the locking section 18 can take the form of a relatively untapered section in the tapered walls of the groove guide 22 (e.g. relatively parallel to the centerline 24). In alternative embodiments, the locking section 18 can be a portion or portions of the longitudinal edges 27 and 29 that are tapered at an angle to the longitudinal centerline 24 differently than the taper of the adjacent portions of the longitudinal edge(s) 27 and/or 29. In yet other embodiments, the locking section 18 can be any other discontinuity in one or both of the longitudinal edges 27 and 29 of the groove guide 22. Further, the groove guide 22 may include any number of the same or different locking sections 18 located anywhere along the longitudinal edges 27 and 29. As shown in FIG. 2A, the locking section may be located generally adjacent the first end 26 of the groove guide 22. This allows for easy insertion of the pin into the groove until the pin reaches the locking region 8, where friction between the pin and groove is increased and the pin is locked into place. In an alternative embodiment, as shown in FIG. 2C, the locking section 18 may be located on only one of the longitudinal edges 27 of the guide groove and may be disposed away from the first end 26.

Figures 2D, 2E:
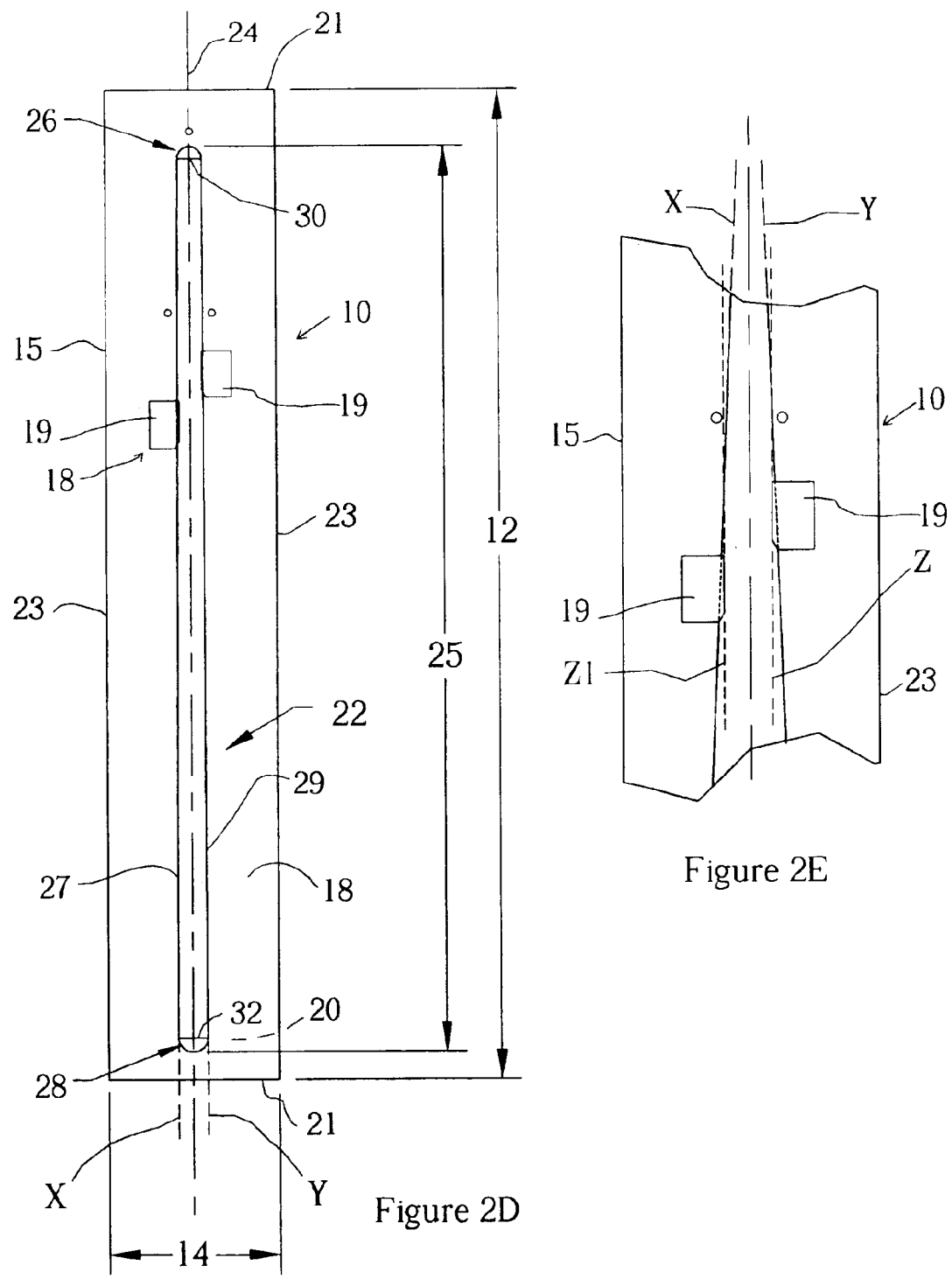

In any case, the locking section 18 can include one or more discontinuities from the plane of the longitudinal edge to which it is associated and such discontinuities can be of any size and shape. For example, as noted above, the locking section 18 can include regions of the tapered longitudinal edge(s) 27 and/or 29 that are generally parallel to the centerline 24 of the guide groove 22 and out of plane with respect to the corresponding tapered longitudinal edge(s) 27 and/or 29. In alternative embodiments, the locking section can include one or more "bumps" or other discontinuities that extend from the longitudinal edge(s) 27 and/or 29. Further, the locking section 18 can be formed from the same material that makes up the guide plate 10 or may be a different material that is permanently or non-permanently joined to the guide plate 10. In one exemplary embodiment of a non-permanent configuration of the present invention as shown in FIGS. 2D and 2E, the locking section 18 can be formed from a piece of material such as a clip 19 that can be temporarily joined to the guide plate 10. In such embodiments, the clip 19 can be configured so as to fit in only one or more predetermined locations, or can be configured to fit in any variety of places on one or more of the longitudinal edges 27 and 29 of the guide groove 22.

The tapered sliding dovetail guide plate 10 may be made of any dimensionally stable material, including materials such as aluminum, steel, other metals, plastics, wood, etc. The thickness 16 of the guide plate 10 can be any practical thickness for any particular use. In certain embodiments, it has been found to be desirable to have a thickness 16 of about ¼ inch (about 0.635 cm). One exemplary suitable guide plate 10 may be made from about ¼ inch (about 0.635 cm) thick aluminum plate. Although the length 12 and width 14 of the plate 10 can be any suitable dimension, for typical woodworking purposes, a length of between about 3 inches and about 36 inches (about 7.6 cm to about 91.4 cm) and a width of between about 2 and about 12 inches (about 5.1 cm to about 30.5 cm) has been found to work well.

As shown in FIG. 2B, the guide plate 10 of the present invention may also include one or more stabilizing pins 34 extending from the bottom surface 20 (workpiece facing surface) of the guide plate 10. The stabilizing pins 34 are useful to help temporarily tack the guide plate 10 to the workpiece while the dovetail groove is being cut. The use of stabilizing pins 34 provides a means for attaching the guide plate 10 to the workpiece without the need for clamps or other devices that can obstruct the path of the cutting tool. Accordingly, it may be desirable that the stabilizing pins 34 do not extend significantly outwardly or at all from the top surface 18 of the guide plate 10. (Of course, other attachment means can be used in conjunction with the stabilizing member of the present invention.) The guide plate 10 can include any number of permanent or removable stabilizing pins 34 and the stabilizing pins 34 can be located anywhere on the bottom surface 20 of the guide plate 10. In the embodiment shown, a stabilizing pin 34 is located adjacent the first end 26 of the guide groove 22 and one is located adjacent one of the longitudinal edges 27 or 29. If more stabilizing pins 34 are used, they are typically located adjacent one or both of the longitudinal edges 27 and 29 in relatively regular intervals, although any location suitable for the particular job is contemplated. For typical woodworking projects, locating the stabilizing pins 34 about every 1 to 3 inches (about 2.54 cm to about 7.62 cm) works well.

The stabilizing pins 34 can all be the same or can be different in shape, dimension, make-up and/or any other property. In alternative embodiments, the guide plate 10 may include one or more holes through which pin, nails, screws or the like can be passed into the workpiece so as to stabilize the guide plate 10 when in use. In yet other embodiments, any suitable stabilizing means can be used, including but not limited to, adhesive, hook and loop fasteners, bolts, clamps, a friction member (such as rubber, sandpaper or any other material capable of creating friction between the guide plate 10 and the workpiece), and any other stabilizing means known in the art. Of course, the guide plate 10 can include or be used with any number of different types of stabilizing means in combination with one another. As shown in FIG. 2A, the guide plate 10 may include stabilizing pins 34 and apertures 36. The apertures 36 provide a location for attaching secondary stabilizing means such as clamps, screws, bolts, or any of the other stabilizing means described herein or otherwise known, etc. In certain embodiments, it may be desirable to use only the secondary stabilizing means, thus, the stabilizing pins 34 may be removable.

Tapered Sliding Dovetail Pin Guide

FIGS. 3A–3F show examples of the tapered sliding dovetail pin guide of the present invention. The tapered sliding dovetail pin guide 40 is used to guide a router or other cutting mechanism during the forming of a pin on the end of a workpiece. In normal use, the pin of the workpiece is slid into a dovetail groove, such as the dovetail groove formed by the guide plate 10 of the present invention, so as to form a dovetail joint. However, with conventional hand tools, it is generally very difficult to form a pin that will slide into a corresponding groove without undue effort and form a strong joint. Thus, it has been found advantageous to use the tapered sliding dovetail pin guide 40 of the present invention to form the pin.

Figure 3A:
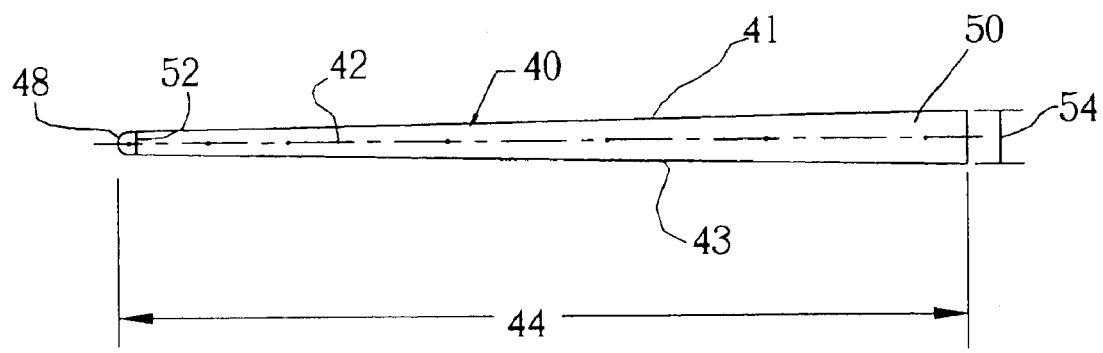
FIG. 3A is a plan view of an embodiment of a tapered sliding dovetail pin guide.
Figure 3B:
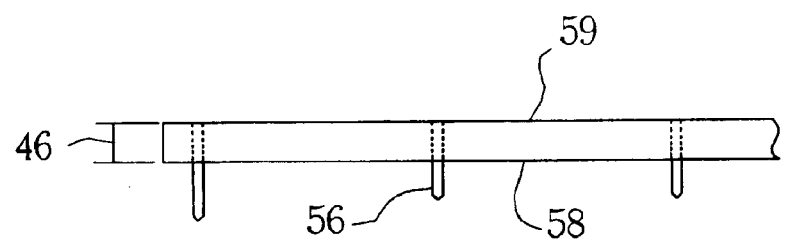
FIG. 3B is a partial side view of the tapered sliding dovetail pin guide shown in FIG. 3B.
Figure 3C:
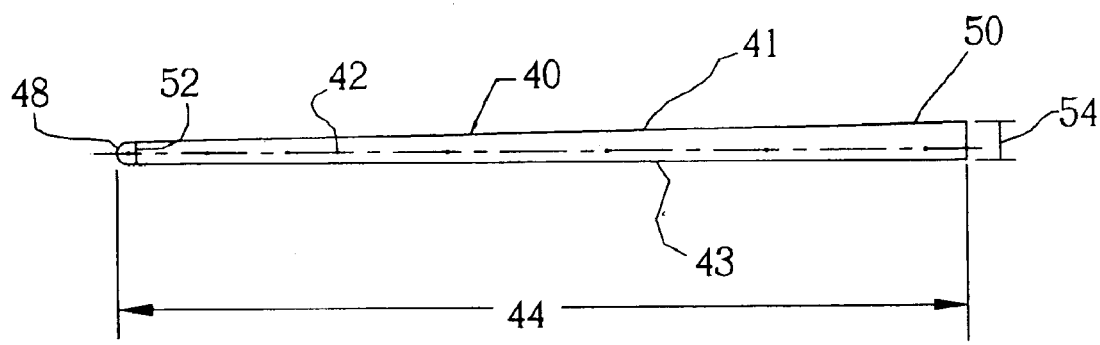
FIG. 3C is a plan view of an alternative embodiment of a tapered sliding dovetail pin guide.

As shown in FIGS. 3A–3C, the tapered sliding dovetail pin guide 40 comprises a generally oblong member having a longitudinal centerline 42, a length 44, a thickness 46, a workpiece side 58, a tool side 59 and two opposed ends, a minor end 48 and a major end 50. (Although the pin guide template is shown with a single pin guide 40, it is contemplated that two or more of the pin guides 40 could be permanently or non-permanently associated with each other to form a single tool.) The minor end 48 of the pin guide 40 has a minor width 52 and the major end 50 has a major width 54 that is larger than the minor width 52. Thus, the pin guide 40 tapers in width from the major end 50 to the minor end 48. Although the taper of the pin guide 40 can be any desirable amount, it has been found that for typical woodworking projects, a taper from about 0.1 degrees to about 3.0 degrees works well. In certain preferred embodiments, a taper of about 0.2984 degrees has been found to be desirable. Typically, it is desirable for the taper of the pin guide 40 to match the taper of the groove guide 10. This helps ensure that the pin and groove will fit together snugly throughout their length if cut properly. However, embodiments are contemplated wherein the taper of the pin guide 40 is different from the taper of the guide groove 10 along some or all of the length of the devices. It is also possible to achieve the same effect by tapering only one side of the tapered sliding dovetail pin guide 40, one example of this is shown in FIG. 3C.

In the exemplary embodiment shown in FIGS. 3A and 3B, the minor end 48 of the pin guide 40 is curved and the major end 50 is generally linear. However, either end can be curved or linear or any other suitable shape. The minor width 48 can be any suitable width for the desired end use of the device, however, a minor width in the range of about 0.33 inches to about 0.50 inches (about 0.838 to about 1.27 cm) has been found to be suitable for most woodworking projects. In certain embodiments, a minor width 8 of about 0.4375 inches (about 1.111 cm) has been found to be desirable. As with the taper of the pin guide 40, it may be desirable to correlate the minor width 52 of the pin guide 40 with the minor width 30 of the guide groove 22. This may help ensure that the minor end 48 of the pin can be forced completely into the corresponding end of the groove and yet provide a snug fit. However, embodiments are contemplated wherein the minor width 52 of the pin guide 40 is different from the minor width 30 of the guide groove 10. Further, as with the guide groove 22, the pin guide 40 may be tapered along one or both of its longitudinal sides 41 and 43. That is, one or both of the longitudinal sides 41 and/or 43 may be nonparallel to the longitudinal centerline 42 of the pin guide 40. In the embodiment shown in FIG. 3A, both longitudinal sides 41 and 43 are nonparallel to the longitudinal centerline 42 and each other. In the embodiment shown in FIG. 3C, the longitudinal side 43 is generally parallel to the centerline 42 and the longitudinal side 41 is not.

The exact length 44 and thickness 46 of the pin guide can vary depending on the desired end use for the device.

However, in general, the length 44 of the pin guide 40 should be at least as long as the pin to be created. Further, for ease of use, it is desirable for the thickness 46 of the pin guide to be generally equal to the thickness 16 of the guide plate 10. This allows the same cutting tool to be used to cut both the pin and groove of the dovetail joint without changing the depth of the cutter.

As shown in FIG. 3B, the pin guide 40 of the present invention may also include one or more stabilizing pins 56 extending from the workpiece side 58 of the pin guide 40. The stabilizing pins 56 are useful to help temporarily tack the pin guide to the workpiece while the dovetail pin is being cut. The use of stabilizing pins 56 provides a means for attaching the pin guide 40 to the workpiece without the need for clamps or other devices that can obstruct the path of the cutting tool. Accordingly, it may be desirable that the stabilizing pins 56 do not extend significantly outwardly or at all from the tool side 59 of the pin guide 40. The pin guide 40 can include any number of permanent or removable stabilizing pins 56 and the stabilizing pins 56 can be located anywhere on the workpiece side 58 of the pin guide 40. In the embodiment shown, the stabilizing pins 56 are located along the longitudinal centerline 42 of the pin guide 40 in relatively regular intervals. For typical woodworking projects, locating the stabilizing pins 56 about every 1 to 3 inches (about 2.54 cm–7.62 cm) works well.

The stabilizing pins 56 can all be the same or can be different in shape, dimension, make-up and/or any other property. In alternative embodiments, the pin guide 40 may include one or more holes through which pin, nails, screws or the like can be passed into the workpiece so as to stabilize the pin guide 40 when in use. In yet other embodiments, any suitable stabilizing means can be used, including but not limited to, adhesive, hook and loop fasteners, bolts, clamps, a friction member (such as rubber, sandpaper or any other material capable of creating friction between the pin guide 40 and the workpiece), and any other stabilizing means known in the art. Of course, the pin guide 40 can include or be used with any number of different types of stabilizing means in combination with one another.

In certain embodiments, it may be desirable to provide the pin guide 40 with a locking element that is designed to direct the cutting tool in such a way that at least a portion of one of the sides of the pin 1 in the workpiece acts to increase the friction between the pin 1 and the groove 4 or otherwise provide a locking feature to the joint. This feature is generally the opposite of that shown in FIG. 1A. Rather than the groove 4 having the locking feature, as shown in FIG. 1A, the pin 1 would have the locking feature.

Figure 3D:
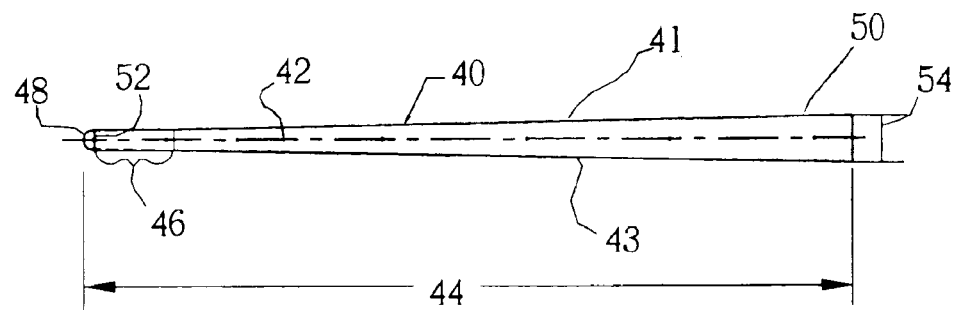
FIG. 3D is a plan view of an alternative embodiment of a tapered sliding dovetail pin guide.
Figure 3E:
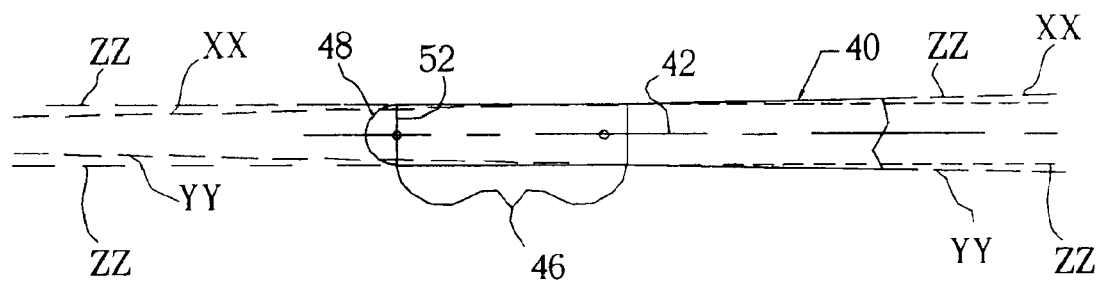
FIG. 3E is an enlarged plan view of a portion of the tapered sliding dovetail pin guide of FIG. 3D.

The locking section 46 of the pin guide 40 can include any suitable structure for providing a locking region on the pin 1. In certain embodiments, as shown in FIGS. 3D and 3E, the locking section 46 can take the form of a relatively untapered section in the tapered walls of the pin guide 40 (e.g. can be relatively parallel to the centerline 42). In alternative embodiments, the locking section 46 can be a portion or portions of the longitudinal sides 41 and 43 that are tapered at an angle to the longitudinal centerline 42 differently than the taper of the adjacent portions of the longitudinal edge(s) 41 and/or 43. In yet other embodiments, the locking section 46 can be any other discontinuity in one or both of the longitudinal sides 41 and 43 of the pin guide 40. Further, the pin guide 40 may include any number of the same or different locking sections 46 located anywhere along the longitudinal sides 41 and 43. As shown in FIGS. 3D and 3E, the locking section may be located generally adjacent the minor end 48 of the pin guide 40. In an alternative embodiment, as shown in FIG. 3E the locking section 46 may be located on only one of the longitudinal sides 43 of the pin guide 40 and may be disposed away from the minor end 48.

Figure 3F:
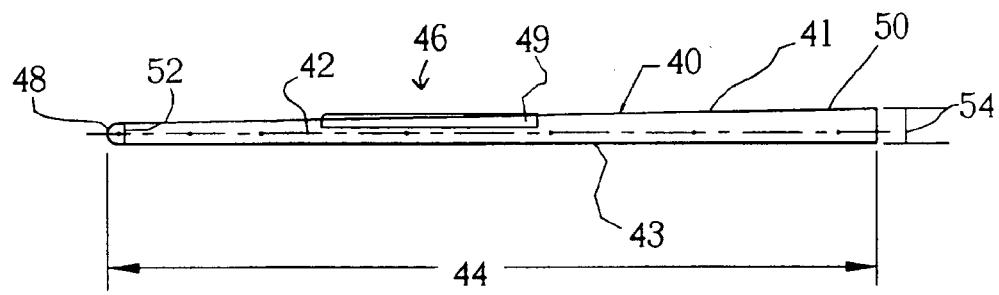
FIG. 3F is a plan view of an alternative embodiment of a tapered sliding dovetail pin guide.

In any case, the locking section 46 can include one or more discontinuities from the plane of the longitudinal side to which it is associated and such discontinuities can be of any size and shape. For example, as noted above, the locking section 46 can include regions of the tapered longitudinal sides 41 and/or 43 that are generally parallel to the centerline 42 of the pin guide 40 and out of plane with respect to the corresponding tapered longitudinal side(s) 41 and/or 43 (i.e. plane ZZ of the locking section 46 is not the same as plane XX or plane YY of longitudinal sides 41 and 43, respectively). In alternative embodiments, the locking section 46 can include one or more "bumps" or other discontinuities that extend from the longitudinal side(s) 41 and/or 43. Further, the locking section 46 can be formed from the same material that makes up the pin guide 40 or may be a different material that is permanently or non-permanently joined to the pin guide 40. In one exemplary embodiment of a non-permanent configuration of the present invention as shown in FIG. 3F, the locking section 46 can be formed from a piece of material such as a clip 49 that can be temporarily joined to the pin guide 40. (The clip can also be configures so as to fit on either the pin guide 40 or the groove guide 22.) In such embodiments, the clip 49 can be configured so as to fit in only one or more predetermined locations, or can be configured to fit in any variety of places on one or more of the longitudinal sides 42 and 43 of the pin guide 40.

The pin guide 40 may be made of any dimensionally stable material, including materials such as aluminum, steel, other metals, plastics, wood, etc. In certain embodiments, it may be possible to cut the pin guide 40 from the guide plate 10 when forming the guide groove 22.

Router Stabilizer

Figure 4:
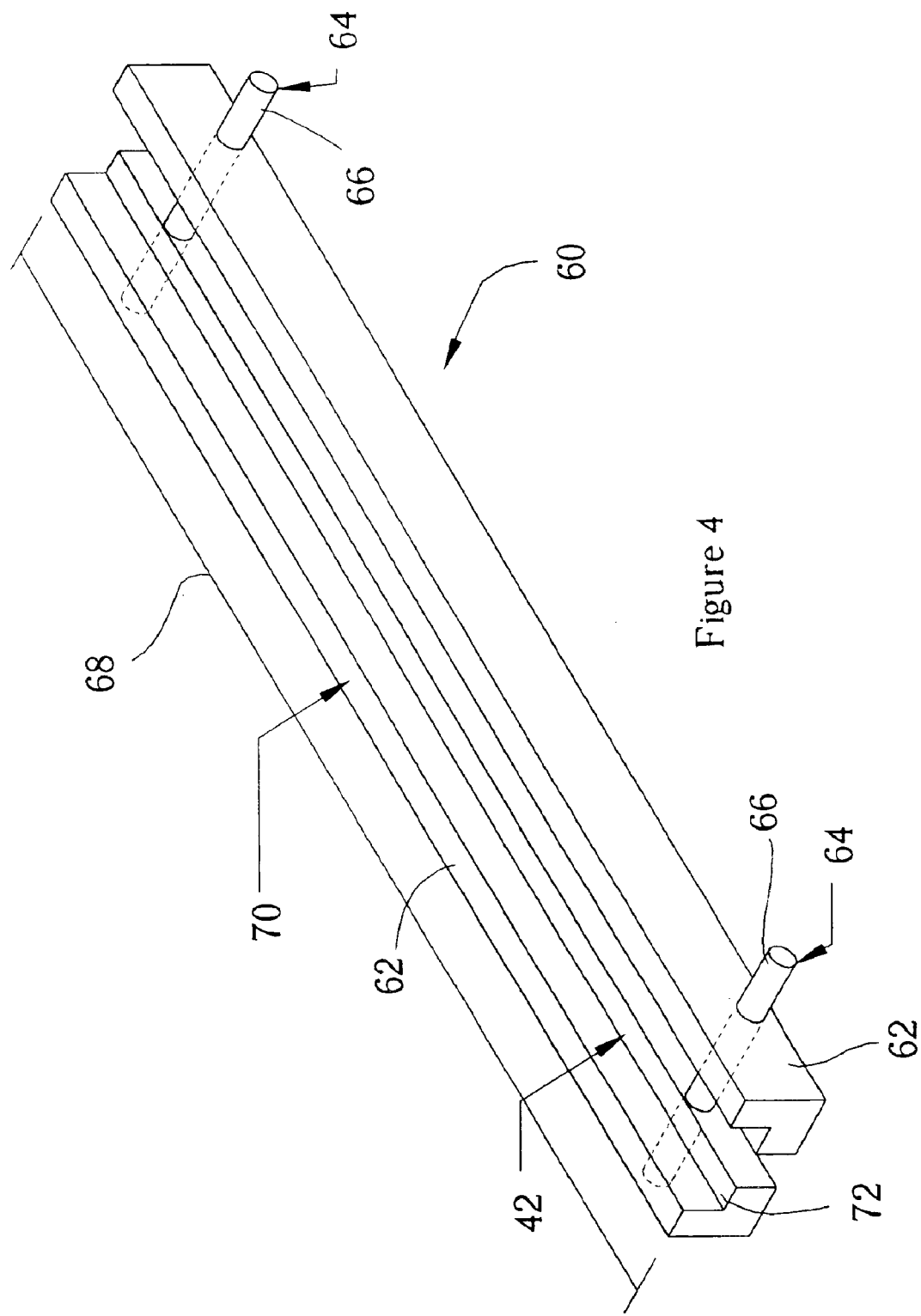
FIG. 4 is a prospective view of an exemplary embodiment of a router stabilizer suitable for use with the present invention.

FIG. 4 shows an exemplary embodiment of a router stabilizer 60 suitable for use with the present invention. The router stabilizer 60 can be used to help stabilize a router as it is used in conjunction with the pin guide 40 to cut a pin in a workpiece. This in turn, can help ensure that the pin will be more accurately cut than if cut without the use of the router stabilizer 60.

As shown in FIG. 4, the router stabilizer 60 may include two generally elongated rail members 62 disposed generally parallel to each other and held together by at least one spacing element 64, such as rods 66. In a preferred embodiment, the rail members 64 are moveable with respect to each other in at least a direction generally perpendicular to the length 68 of the rail members 62. Each rail member 62 preferably also includes a top surface 70 and a toe surface 72. The top surface 70 is shown in FIG. 4 to be at right angle to the toe surface 72, however, the surfaces can be at any angle with respect to each other. When clamped to the face of the workpiece, the toe surface 72 ensures that the top surface 70 can be set to be in the same plane as the workpiece side 58 of the pin guide 40. This allows the pin guide 40 and router stabilizer 60 to work together to control the formation of the tapered sliding dovetail pin 1.

In one embodiment, as shown in FIG. 4, then rails 62 may be generally "L" shaped. The top of the "L" may form the top surface 70 on which a router or other tool may slide during use and the horizontally extending portion of the "L" may form the toe surface 72. In use, the toe surfaces 72 of the rails are generally located toward each other to form a space for the cutting tool to maneuver about the pin guide 40.

The router stabilizer 60 may be made of any dimensionally stable material, including materials such as aluminum, steel, other metals, plastics, wood, etc. In one embodiment, the stabilizer 60 is made from wood. The length of the rails 62 is not critical; however, it is desirable for the rails 62 to be at least as long as the pin to be cut. In certain embodiments, it is preferred that the rails 62 be at least about 3 inches (76.2 mm) longer than the pin guide 40 to be used such that the cutting tool can be stabilized over the entire length of the pin forming operation.

In use, the workpiece with the pin guide 40 mounted on an end is sandwiched between the two rail members 62 of the router stabilizer 60. The rail members 62 may be clamped or otherwise held in position about the workpiece. The router or other cutting mechanism is placed on the router stabilizer 60 and slid along the top surface of the rails 62 when cutting the pin 1.

Depth of Cut Gage

Figure 5:
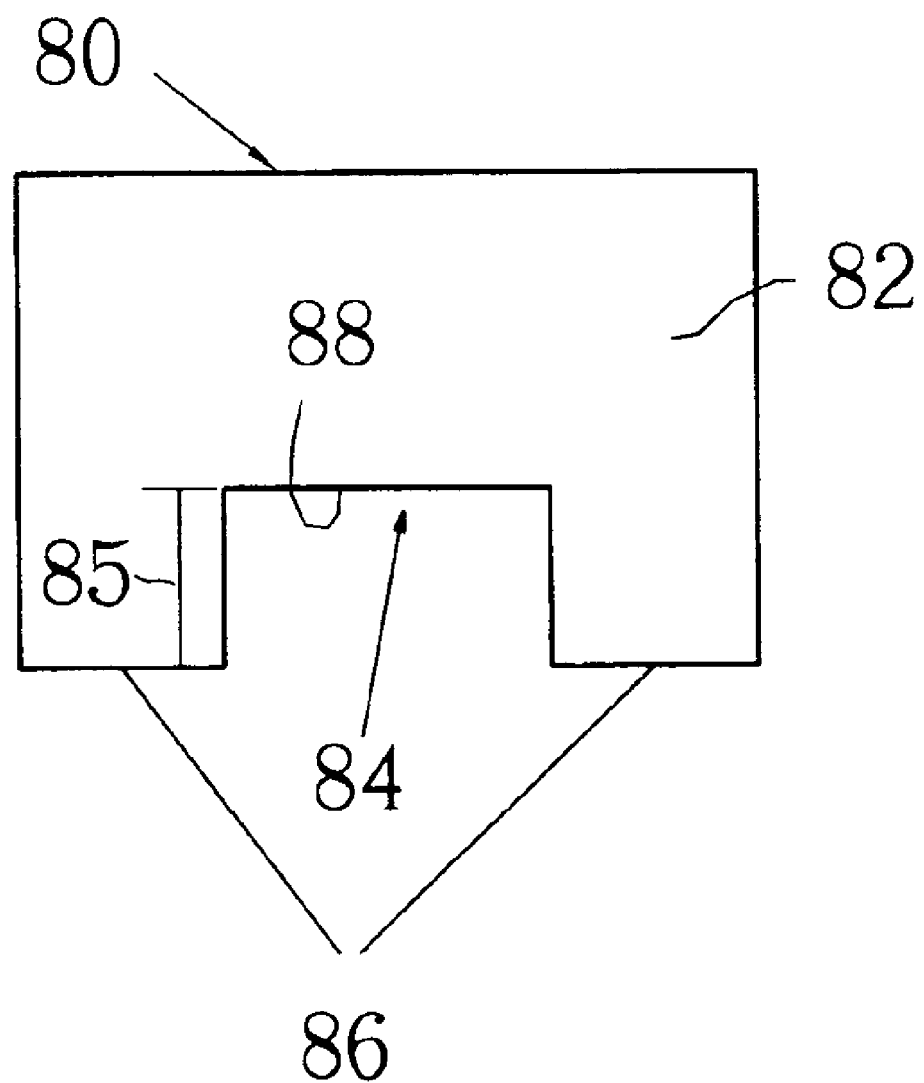
FIG. 5 is a plan view of an embodiment of a depth of cut gage.

As shown in FIG. 5, the present invention may include a depth of cut gage 80. The gage 80 may be any size, shape or material that is provided with a means for properly setting the depth of the cutting tool to be used with the device of the present invention. In one embodiment, the depth gage 80 may be made from a block 82 of aluminum. In other embodiments, the dept of cut gage 80 may be formed in the router stabilizer 60, the tool package or any other tool or piece of a kit. The block 82 includes a recessed region 84 that can act as a guide for setting the depth 85 of a cutting tool. For example, when used with a router, the index surfaces 86 of the depth of cut gage 80 are placed on the sole of the router. This fixes the recessed surface 88 at a fixed distance over the router base. The router bit is then adjusted so that the cutter just contacts the recessed surface 88 of the depth of cut gage 80, and locked in place. This procedure fixes the dovetail cutter projection relative to the router sole plate and thus, ensures that the cut is the proper depth. The depth gage 80 may be configured to work with any cutting bit, any size pin guide and/or groove guide and any type of workpiece material.

Tapered Sliding Dovetail Tool Kit

The individual devices described above (i.e. the depth gage, the guide plate, the pin guide and the router stabilizer) can be used separately or in combination with each other or other devices. In certain embodiments, it may be advantageous to purchase or use more than one of the devices together. In such instances, the devices may for part or all of a kit. Although a kit could include any combination of the above described devices, in one preferred embodiment, the kit may include at least one depth gage 80, at least one guide plate 10, at least one pin guide 40 and at least one router stabilizer 60. Of course, the kit could also include other tools and/or devices that work with or separately from the devices described herein. For example, the kit may include a cutting tool such as a router and/or a router bit or other cutting bit. Further, the kit could include instructions for using one or more of the devices provided in the kit and may provide instructions as to the use of tools not included in the kit. The kit may also include a package to temporarily or permanently store the devices included in the kit and or other devices that may be useful to have in close proximity when using one or more of the devices of the kit. For example, the kit may include a carrying case for storing and carrying the tools included in the kit as well as other tools to be used with the tools of the kit.

While particular embodiments of the present invention have been illustrated and described, it would be obvious to those skilled in the art that various other changes and modifications can be made without departing from the spirit and scope of the invention. Further, it should be apparent that all combinations of such embodiments and features can result in preferred embodiments of the invention. It is therefore intended to cover in the appended claims all such changes and modifications that are within the scope of the invention.

I claim:

1. A template for making a tapered sliding dovetail groove in a workpiece, the template comprising:
   a groove guide made from a plate having a length, a width, a thickness, a top surface, a bottom surface, a perimeter and at least one groove having a longitudinal centerline, a first groove edge disposed in a first plane, a second groove edge disposed in a second plane, a first end having a minor width and a second end having a major width that is larger than the minor width, wherein the first end of the groove is located inward from the perimeter of the plate; and
   a locking section disposed on at least one of the first groove edge or the second groove edge, wherein at least a portion of the locking section is disposed in a plane that is different from the first plane or the second plane which corresponds to the first or second groove edge on which the locking section is located.

2. The template of claim 1 further including at least one stabilizing member disposed on the bottom surface of the plate for holding the template in place while the sliding dovetail groove is being formed in the workpiece.

3. The template of claim 1 wherein both the first groove edge and the second groove edge are non-parallel to the longitudinal centerline and the plane of at least a portion of the locking section is generally parallel to the longitudinal centerline.

4. The template of claim 1 wherein both the first groove edge and the second groove edge include a locking section.

5. The template of claim 4 wherein the locking sections are each disposed in a plane that is generally parallel to the longitudinal centerline.

6. The template of claim 4 wherein the locking section is disposed adjacent the first end of the groove.

7. The template of claim 1 wherein the locking section is integral with the template.

8. The template of claim 1 wherein the locking section includes a separate material from the template that is permanently or non-permanently joined to the template.

9. The template of claim 1 wherein the locking section includes a clip that can be permanently or non-permanently joined to the template.

10. The template of claim 2 wherein the stabilizing member includes at least one pin extending from the bottom surface of the plate.

11. The template of claim 2 wherein the plate includes two or more stabilizing members.

12. The template of claim 2 wherein the stabilizing member is disposed adjacent at least first end of the guide groove.

13. The template of claim 2 wherein the stabilizing member includes a bolt, adhesive, a friction member, hook and loop fasteners or a combination thereof.

14. The template of claim 2 wherein the stabilizing member includes pins, nails or screws that are permanently or temporarily passed through holes in the template.

15. The template of claim 2 further including a secondary stabilizing means in addition to the stabilizing member.

16. The template of claim 1 wherein one of the first groove edge is parallel to the longitudinal centerline and the second groove edge is nonparallel to the longitudinal centerline.

17. The template of claim 1 wherein both the first groove edge and the second groove edge are nonparallel to the longitudinal centerline and each other.

18. The template of claim 1 wherein the groove guide tapers in width between about 0.1 degrees and about 3.0 degrees.

19. The template of claim 1 wherein the stabilizing member does not extend outwardly from the top surface of the template.

20. A kit for making locking tapered sliding dovetail joints, the kit including:
   at least one pin guide having a longitudinal centerline, a thickness, a pair of side edges, a workpiece side, a tool side, a minor end having a minor width and a major end having a major width that is larger than the minor width such that the template has a taper in width from the major end to the minor end, wherein at least one stabilizing member is disposed on the workpiece side of the template for holding the template in place while the sliding dovetail pin is being formed from the workpiece; and
   at least one groove guide made from a plate having a length, a width, a thickness, a top surface, a bottom surface, a perimeter and at least one groove having a longitudinal centerline, a first groove edge disposed in a first plane, a second groove edge disposed in a second plane, a first end having a minor width and a second end having a major width that is larger than the minor width, wherein the first end of the groove is located inward from the perimeter of the plate, a locking section disposed on at least one of the first groove edge or the second groove edge, wherein at least a portion of the locking section is disposed in a plane that is different from the first plane or the second plane which corresponds to the first or second groove edge on which the locking section is located.

21. The kit of claim 20 further including at least one stabilizing member is disposed on the bottom surface of the guide plate for holding the guide plate in place while the sliding dovetail groove is being formed from the workpiece.

22. The kit of claim 20 wherein the thickness of the pin guide is substantially the same as the thickness of the groove guide.

23. The kit of claim 20 wherein the taper of the pin guide is substantially the same as the taper of the groove guide.

24. The kit of claim 20 wherein the pin guide has a first edge disposed in a first pin edge plane and a second edge disposed in a second pin edge plane, and wherein the pin guide includes a pin guide locking section that is at least partially disposed in a plane that is different from the first pin edge plane or the second pin edge plane which corresponds to the first pin edge or the second pin edge on which the pin guide locking section is located.

25. The kit of claim 20 wherein the pin guide includes two or more stabilizing pins extending from the workpiece side of the pin guide and the guide plate includes two or more stabilizing pins extending from the bottom surface of the guide plate.

26. The kit of claim 20 further including a router stabilizer, the router stabilizer comprising:
   a first rail member,
   a second rail member, and
   at least one spacing element, the spacing element providing a means for holding the first rail member and the second rail member in a desired configuration with respect to each other.

27. The kit of claim 20 wherein the first rail of the router stabilizer has an L shape defining a top surface on which a router tool can slide and a toe surface against which a workpiece can be positioned.

28. The kit of claim 20 wherein both the first rail and the second rail of the router stabilizer have an L shape defining a top surface on which a router tool can slide and a toe surface against which a workpiece can be positioned, and wherein the first rail and the second rail are oriented such that the toe surface of the first rail is disposed toward the toe surface of the second rail during use.

29. The kit of claim 20 wherein the spacing element allows for slideable adjustment of the first rail in relation to the second rail.

30. The kit of claim 20 further including a dept of cut gage.

31. The kit of claim 30 wherein the depth of cut gage is formed in the router stabilizer.

32. A locking sliding dovetail groove made using the template of claim 1 wherein the groove includes a groove locking section formed when a cutting tool is directed around the template when the template is disposed adjacent a workpiece.

* * * * *